United States Patent [19]
Witzmann et al.

[11] Patent Number: 5,902,368
[45] Date of Patent: May 11, 1999

[54] METHOD FOR THE HEAT-SOFTENED SEVERANCE OF GLASS TUBES OR PLATES

[75] Inventors: André Witzmann, Waldershof; Ulla Trinks, Mitterteich, both of Germany

[73] Assignee: Schott-Glaswerke, Mainz, Germany

[21] Appl. No.: 09/007,408

[22] Filed: Jan. 15, 1998

Related U.S. Application Data

[63] Continuation of application No. 08/550,780, Oct. 31, 1995, abandoned.

[30] Foreign Application Priority Data

Dec. 14, 1994 [DD] German Dem. Rep. ............ 44 44 547

[51] Int. Cl.$^6$ ........................... C03B 21/00; C03B 29/00
[52] U.S. Cl. ..................... 65/105; 65/56; 65/108; 65/112; 65/113
[58] Field of Search .................. 65/56, 105, 108, 65/112, 113

[56] References Cited

U.S. PATENT DOCUMENTS

| | | |
|---|---|---|
| 2,379,342 | 6/1945 | Cozzoli ........................ 65/108 |
| 3,817,733 | 6/1974 | Thuler. | |
| 4,350,722 | 9/1982 | Trutnert et al. ................ 65/108 |
| 4,600,424 | 7/1986 | Flaming ........................ 65/108 |
| 4,869,745 | 9/1989 | Flaming ........................ 65/108 |
| 4,913,719 | 4/1990 | Flaming ........................ 65/105 |
| 4,921,522 | 5/1990 | Flaming ........................ 65/105 |
| 5,143,533 | 9/1992 | Brusasco ....................... 65/36 |
| 5,181,948 | 1/1993 | Belgum ......................... 65/105 |
| 5,254,833 | 10/1993 | Okiyama ....................... 65/105 |

FOREIGN PATENT DOCUMENTS 1244346 7/1967 Germany.
A966048 10/1982 U.S.S.R..

OTHER PUBLICATIONS

Silicates Industriels, Bd. 38, Nr. 7/8, 1973, Belgien, pp. 145–147, XP002007154, J.–L. Lambert: "Découpe d'un verre plat étiré à l'aide d'un laser au $CO_2$".

*Primary Examiner*—Peter Chin
*Assistant Examiner*—Michael P. Colaianni
*Attorney, Agent, or Firm*—Fulbright & Jaworski, LLP

[57] ABSTRACT

Disclosed is a method for the heat-softened severance of thin-walled glass tubes or plates with a wall thickness of no more than 0.2 mm, wherein the glass is softened on a width of no more than 0.4 mm, the softened area is reduced by drawing to a wall thickness of no more than 0.05 mm, and then is separated by additional heating in the drawn-out area.

18 Claims, 1 Drawing Sheet

METHOD FOR THE HEAT-SOFTENED SEVERANCE OF GLASS TUBES OR PLATES

This is a continuation of U.S. Ser. No. 08/550,780 filed Oct. 31, 1995, now abandoned, which is hereby incorporated by reference.

BACKGROUND OF THE INVENTION

The invention relates to a method for severing glass tubes or plates by thermal softening.

The severing of glass tubes and plates is one of the frequently occurring operations during the processing and treatment of glass tubes and plates. The most frequently used severing method consists of bursting or breaking, based on producing a tension zone in the glass and in some cases a weak point created by an initial scoring, after which the glass tube or plate can be severed with the formation of a fissure. These methods are extremely quick, but they have the disadvantage that the fissure does not always run precisely along the desired line of severance, and mainly that the breaking point has sharp edges and presents the danger of injury unless the edges are not eased by fusion. Furthermore, in the case of thin glass, heating may not create sufficient breaking tensions. In the case of mechanical breaking, possibly by means of preliminary scoring, unstable ends develop so that cracks running in the direction of the length of the tube may be created.

It is also known to sever glass tubes by thermal softening wherein the glass is softened at the severance point, and the softened parts are removed from one another by further heating, which is accomplished either automatically by the effect of gravity or by drawing them apart mechanically. A method of this kind is described, for example, in Russian Patent 9 66 048. A disadvantage of this method is that frequently a bead forms at the severance point and its diameter is greater than the wall thickness of the tube. Especially in the case of glass tubes with a wall thickness of 0.25 mm and less, severance by thermal softening has been impossible without the formation of a bead along the edge. The bead, however, is extremely undesirable in many applications, because the bead at the severance point gives the glass tube a different outside and inside diameter than the remainder of the tube.

It is likewise known to cut glass by means of a high intensity laser beam. In this case the glass is evaporated by the laser beam along the severance line. The disadvantages of this process are resulting high thermal tensions in the glass, the condensation of vaporized glass and its decomposition products in the vicinity of the severance point, and sometimes undesirable beading.

The present invention is addressed to the problem of providing a method for the heat-softened severance of thin glass plates and glass tubes, in which neither a greater outside diameter nor a smaller inside diameter than those of the original tube will result, and in which no bead will be formed that is greater than the thickness of the glass plate.

The various features of novelty which characterizes the invention are pointed out with particularity in the claims annexed to and forming a part of this specification. For a better understanding of the invention, its operating advantages and specific objects obtained by its use, and reference should be had to the accompanying drawings and descriptive matter in which there is illustrated and described a preferred embodiment of the invention.

DESCRIPTION OF THE PREFERRED EMBODIMENT

Figure 1:
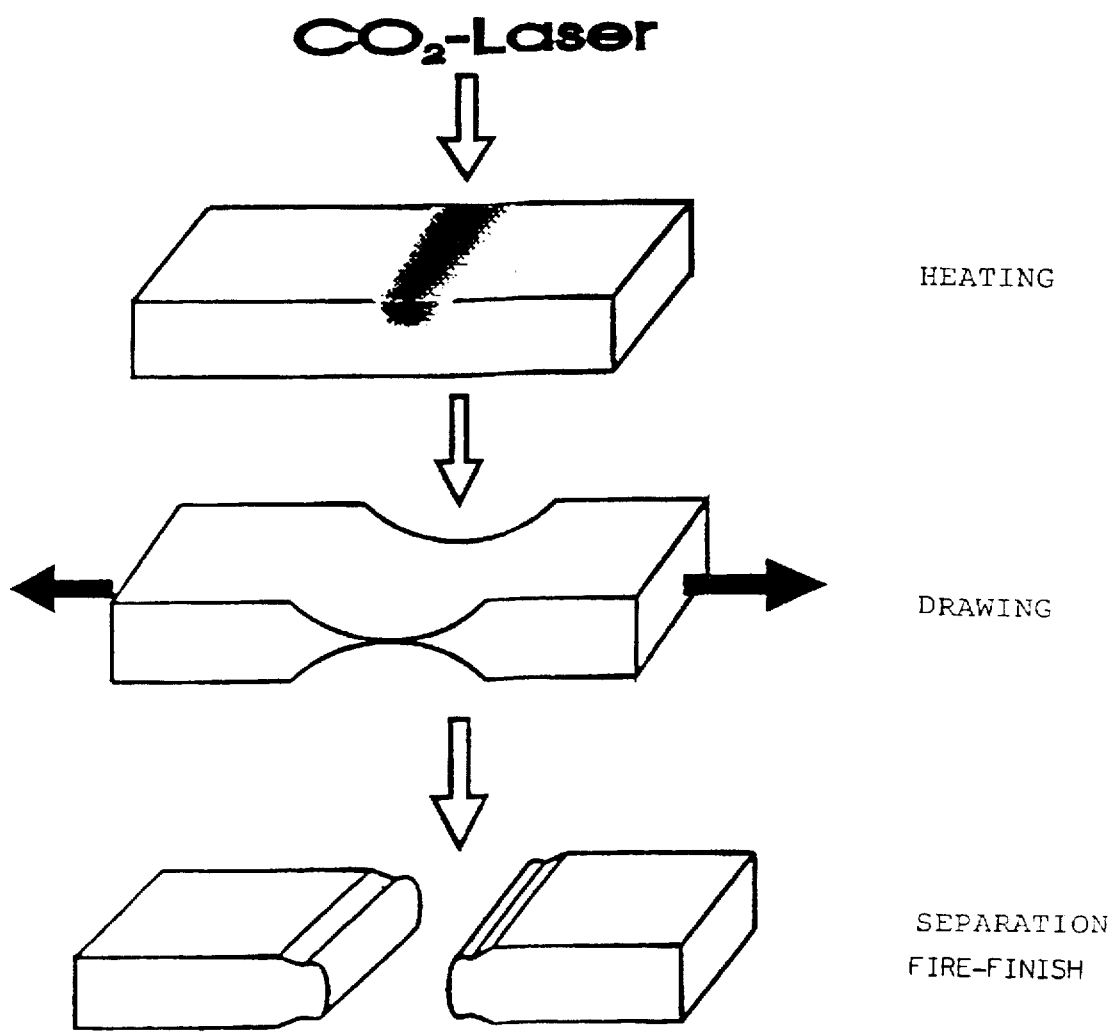
FIG. 1 generally depicts the method of the invention for a glass slip.

The above described problem is solved by the method of the invention for the heat-softened severance of glass tubes or plates wherein the glass tube or plate is softened at the severance point. The wall thickness in the heated area is reduced by drawing by further heating.

In the method of the invention, a thin-wall glass tube, or glass plate having a thickness, of no more than 0.2 mm, is softened along a desired line of severance on a width of no more than 0.4 mm. The softened part is drawn to a wall thickness of no more than 0.05 mm, and then severance is performed by further heating in the drawn area.

The softening of the plate along the desired severance line, or softening of the tube along the severance line running generally perpendicular to the tube axis, is to be performed in a width of no more than 0.4 mm. If the width is greater, the danger of forming a bead with a greater outside diameter than that of the glass tube, or of a greater thickness than the thickness of the plate, becomes more probable. In a preferred embodiment, the tube is softened in a zone of no more than 0.3 mm wide, and more preferably, 0.2 mm wide.

Preferably, as soon as the tube or plate has softened along the severance line, the two tube or plate parts on such side of the severance line or zone are drawn away from one another so that the result is a wall thickness of no more than 0.05 mm, and preferably to a wall thickness of no more than 0.03 mm. The pulling can be performed under mechanically rigid conditions, or by applying a force axial to the tube or plate by springs or weights such that, when an appropriate viscosity is reached, corresponding to the ductility of the heated material, the tube or plate will be pulled apart. In such an embodiment, the amount by which the pulling is done, of course, is limited mechanically, e.g., by an abutment. Pulling by spring bias or weight bias is especially recommended since then, when a sufficient viscosity is reached, the pulling is, so to speak, self-regulated, thereby permitting faster production. The amount by which the two parts are drawn apart in order to produce the necessary wall thickness (draw length) amounts to about five to fifty times the wall thickness or thickness of the glass tube. Of course, the drawing length also depends on the width of the area over which the glass is softened. The more narrow the heated area is, the shorter the required drawing length.

After drawing to the desired wall thickness of no more than 0.05 mm and preferably no more than 0.03 mm, and even while the drawing is in progress, the heating is continued at the severance point in the zone width of no more than 0.4 mm, until the glass mass along the heated dividing line separates. To shape the severed edge and relieve thermal tensions it is advantageous not to shut off the heat source until after severance occurs, especially for about 0.2 to 0.5 seconds after severance.

The heating is preferably performed as rapidly as possible so as to minimize undesirable diffusion of the heat along the tube, but the heating should not be so fast that the glass does not completely soften at the severance point. Also, the heating should not be so fast and so high that portions of the glass mass evaporate and settle as an undesirable precipitate on the tube or plate. With a few trials the technician can determine the heating conditions appropriate for the particular glass and the wall thickness of the tube or thickness of the plate. In general, a heat-softening severance will be completed within less than i second under ordinary conditions. If heating is too slow, the width of the zone in which the glass softens will be too great due to thermal conduction in the glass. If it is desired to limit the softening zone to the required width of no more than 0.4 mm, the heating time up to the softening of the glass should not exceed about one second. That upper limit, however, can vary slightly, depending on the wall thickness of the glass and the heat conductance of the glass.

The softening and severing of the glass tube or glass plate can be performed with any heat source that permits the heated zone to be sufficiently narrow. Preferred is a highly focused infrared radiation source. Heating by laser radiation is especially preferred. In order to insure the required narrow width of the heated zone, the beam width (across the severance line) should be no greater than about 0.2 mm, especially no greater than about 0.1 mm. The laser can be any laser by which a sufficiently great power density of absorbed radiation, i.e., radiation usable for the heating, can be produced along the line of severance. The heating of the severance line by laser radiation can be performed by sufficiently rapid scanning with a laser beam that is preferably spot-focused or elliptically focused along the severance line, and by the use of a laser beam shaped to match the severance line. In the case of comparatively large wall thicknesses, it is advantageous to radiate the severance line or supply radiation to the severance line area from both sides of the wall. The power density time-wise (e.g., in pulsed lasers) and space-wise (e.g., in the case of irregular energy distribution in the focus) should average approximately between 0.3 and 1 kW/cm$^2$. If this power density is exceeded the glass may be vaporized. However, if the power density is too low, the heating period is to long and the temperature increase of the glass can no longer be confined to the necessary narrow zone width due to heat conduction. The power density is, of course, also to be adapted to the way in which the radiation is absorbed into the glass. Preferred laser light sources are those providing a continuous laser beam and $CO_2$ lasers on account of their high power.

The softening of the glass and the severance can take place in direct sequence. As soon as the glass is sufficiently softened it is drawn apart and separates at the thinned point. In a preferred embodiment, the energy source is not shut off or interrupted through the entire softening and separating process. To accelerate the process and reduce thermal tensions, the glass tube or plate can be preheated prior to being brought into the process. The temperatures to which the glass is preheated must not, of course, be so high that the glass is already softening, i.e., the temperatures must be below the transformation temperature of the glass. If such a preheated glass is used in this severing method, only as much energy must be put into the glass to soften it at the severance point as is needed to bring the heated glass up to the temperature necessary for severing. Since this energy is less than it would be if a glass had to be heated up from room temperature, it is possible to use a weaker energy source at the same cycling rate, or, with a weaker energy source, to shorten the cycling times for the severance, in comparison to non-preheated glass.

The advantages achievable by the inventive method in comparison with conventional methods of severance by heat-softening include that tubes and plates with very thin walls can be separated without undesirable edge beading. In comparison to the methods in which the tube or plate is broken, a rounded edge is formed which is mechanically substantially stronger than a broken edge, the rounded edge has no tendency to crumble like a broken edge, and, in contrast with a broken edge, presents no danger of injury in handling. The disadvantages of cutting by laser beam, such as the occurrence of thermal tensions, beading, and the precipitation of vapors are avoided. The method is advantageous wherever thin-walled tubes or flat glass of little thickness are to be severed, and where alternative methods, such as snapping off, melting, scoring or cutting have disadvantages.

EXAMPLE

A glass tube with an outside diameter of 7 mm and a wall thickness of 0.1 mm was held at both ends in a glass lathe and rotated at 360 revolutions per minute. The tube was irradiated with an elliptically focused laser beam from a carbon dioxide laser with an output of 20 watts. The elliptical laser beam had at its point of impingement on the glass semiaxial lengths of 0.1 and 1 mm. The rotation of the tube resulted in a severance line 0.3 mm wide. After 0.7 second the glass was sufficiently softened and the halves were drawn 0.5 mm apart, resulting in a wall thickness of the glass of about 0.05 mm at the severance line. The radiation was continued for another 0.25 second, whereupon the glass separated along the severance line. The bead that formed at the severance line did not impair the inside diameter of the glass tube nor did it exceed the outside diameter of the tube.

It will be understood that the specification and examples are illustrative but not limitative of the present invention and that other embodiments with the spirit and scope of the invention will suggest themselves to those skilled in the art.

We claim:

1. A method for heat-softened severance of a glass tube or plate comprising:

providing a glass tube having a wall thickness of no more than about 0.2 mm or a glass plate having a thickness of no more than about 0.2 mm;

heat-softening the glass tube or plate over an area having a severance point;

forming a drawn area and reducing the tube wall thickness or plate thickness in the heat-softened area by drawing to a thickness of no more than about 0.05 mm;

and severing said tube or plate in the drawn area by further heating without formation of a bead that has a thickness greater than the thickness of the plate or the wall of the tube.

2. The method of claim 1 wherein the heat-softening is over an area which includes a width of no more than about 0.4 mm.

3. The method of claim 1 wherein the glass is softened over an area having a width of no more than 0.3 mm.

4. The method of claim 1 wherein the softened area is drawn to a thickness of no more than 0.03 mm.

5. The method of claim 1 wherein the softening and the severance are performed by means of a laser beam.

6. The method of claim 1 wherein the softening and the severance are performed by means of a continuous laser beam.

7. The method of claim 1 wherein the tube has a tube axis and the severance point is on a severance line running perpendicular to the tube axis.

8. The method of claim 5 wherein the tube is softened over a width of no more than 0.3 mm.

9. The method of claim 5 wherein in the softened area of the tube is drawn to a thickness of no more than 0.03 mm.

10. The method of claim 1 wherein the drawing is self-regulating.

11. The method of claim 6 wherein the drawing is self-regulating.

12. The method of claim 1 wherein the drawing produces a draw length which is 5 to 50 times the thickness of the tube wall or glass plate.

13. The method of claim 1, further comprising:
  heating the severed tube or plate for a period of 0.2 to 0.5 seconds after the severance.

14. The method of claim 1 wherein the heat-softening is for a period t wherein $0 < t \leq 1$ second.

15. The method of claim 1 wherein the glass tube or plate is preheated.

16. The method of claim 10 wherein in the softening and the severance of the tube are performed by means of a laser beam.

17. The method of claim 13 wherein the softening and the severance of the tube are performed by means of a continuous laser beam.

18. The method of claim 15 wherein the tube is heat-softened over a width of not more than 0.4 mm and the tube has a tube axis and the severance point is on a severance line running perpendicular to the tube axis.

* * * * *